Oct. 29, 1935.  J. H. STARK  2,019,323

ALTERNATING CURRENT MOTOR

Filed Aug. 24, 1933

Inventor:
Julian H. Stark,
by Harry E. Dunham
His Attorney.

Patented Oct. 29, 1935

2,019,323

UNITED STATES PATENT OFFICE 2,019,323

ALTERNATING CURRENT MOTOR

Julian H. Stark, Fort Wayne, Ind., assignor to General Electric Company, a corporation of New York Application August 24, 1933, Serial No. 686,559

8 Claims. (Cl. 172—278)

My invention relates to improvements in alternating current motors and particularly to motors of the single-phase type.

It is well known that a single-phase induction motor as such has no starting torque because there is no component of quadrature flux developed in time and space phase with the stator flux when the rotor is at a standstill. There are various ways of starting such a motor which depend upon the development of such a component of quadrature flux, for example, the use of shading coils or the phase splitting method.

It is also known that in the operation of starting motors where the number of pairs of physical poles on the secondary is unequal to the number of pairs of poles on the primary, the rotor will, under certain conditions, lock at a synchronous speed corresponding to the number of secondary poles.

It is an object of my invention to take advantage of these two principles in order to obtain a single-phase motor having two well defined operating speeds.

It is a further object of my invention to construct such a motor which will operate efficiently at either of these operating speeds.

A further object of my invention is to provide a motor of this type having a high starting torque.

A further object of my invention is to provide a single-phase motor which is particularly adapted for driving the record carrier of a phonograph.

Figure 1:
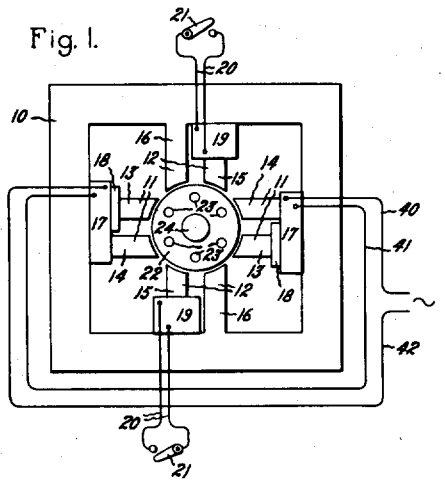
Figure 2:
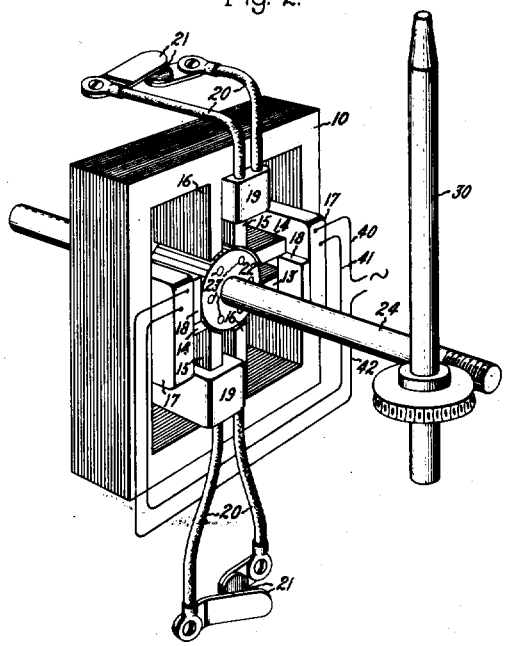

The features of my invention which are believed to be novel and patentable are set forth in the appended claims. My invention, both as to its organization and method of operation, together with further objects and advantages thereof, will be best understood by reference to the following description taken in connection with the accompanying drawing in which Fig. 1 is a side elevation of one embodiment of my invention and Fig. 2 represents the embodiment of Fig. 1 in perspective. The same numerals are used to designate like elements on both figures.

In the drawing I have illustrated the features of my invention as being embodied in a four-pole, single-phase induction synchronous motor, the general elements of which are well known to those skilled in the art. It will be understood that any even number of poles may be used on the primary member. The primary member, which is preferably made the stator, consists of a laminated frame 10 on which are mounted the inwardly extending poles 11 and 12. It will be noted that in the preferred form shown, poles 11 and 12 are split into two sections 13, 14 and 15, 16 respectively, of approximately equal cross-section.

Main exciting windings 17 surround alternate poles 11. These windings 17 are connected in series by conductors 40, 41 and 42 and arranged to be energized by a single-phase alternating current supply to produce opposite poles of the same polarity. Two sets of auxiliary flux shading coils are also provided. The first set consists of permanently short-circuited copper rings 18 surrounding section 13 of the poles 11. The second set of auxiliary flux-shading windings consists of wound coils 19 made of low resistance insulated wire surrounding section 15 of the consequent poles 12. All of the shading coils are symmetrically arranged, that is, all of them are placed on the trailing sections of their respective polar projections with respect to the direction of rotation desired. The terminals of coils 19 are connected by conductors 20 to switches 21 by means of which they may be selectively short-circuited. These switches 21 may be closed by means of a push button, by a centrifugal device, or in any other desired manner.

It will be observed that while I have shown coils 18 as having but a single turn and coils 19 as having a plurality of turns, the limitation is purely relative and under certain circumstances it might be desirable to have coils 18 composed of more than one turn.

The secondary member of the motor is preferably a rotor of the squirrel cage type as indicated at 22. I have shown a squirrel cage winding having six bars 23 extending across the face of the rotor. These bars are short-circuited in the conventional manner by end rings and are preferably embedded in the face of the rotor. With such an arrangement it will be seen that six physical poles are provided between the six rotor bars 23 so that in many respects the rotor is equivalent to a rotor having six salient poles.

The rotor 22 is mounted on a shaft 24 which is rotatably mounted in bearings not shown. In Fig. 2, shaft 24 is shown geared to a phonograph spindle 30 but it will be apparent that my improved motor is capable of many other applications.

In the operation of the embodiment of my motor shown in the drawing, let us assume that 60 cycle alternating current is supplied to the main exciting windings 17. Let us also assume that switches 21 are closed, thus short-circuiting coils 19. Under these circumstances currents are induced in shading coils 18 and 19 in a manner well understood in the art. These induced currents oppose the increase and decrease of flux in the parts of the poles which they enclose. This action serves to create a component of flux in differing time and space phase to the main flux which is necessary to start the motor as a single-phase induction motor. I refer to this displaced flux as a quadrature flux but do not mean that it is necessarily displaced 90 degrees from the main flux. The main flux and the quadrature flux thus developed cooperate with the rotor bars to produce rotation of the rotor. Under these circumstances the motor operates as a single-phase induction type motor having a high starting torque and a well defined speed for any given load. This speed is less than the theoretical synchronous speed of the motor by an amount equal to the slip and the slip depends upon the load. In the case of the four-pole stator illustrated, the speed will be 1800 R. P. M. minus the slip.

If we now open the switches 21, thus open-circuiting the shading coils 19, it will be found that the motor speed will decrease to 1200 R. P. M. This dropping off in speed is due to the fact that with shading coils 19 open-circuited the quadrature flux developed by shading coils 18 is not large enough to develop sufficient torque to maintain the motor speed at its previous value.

The rotor now determines the synchronous speed of the motor thus making the synchronous speed 1200 R. P. M. This speed will hereafter be referred to as the sub-synchronous locking speed of the motor and will of course vary with the various polar relationships selected on the primary and secondary. The torque developed at this speed will likewise be called the sub-synchronous locking torque.

In other words without coils 19 short-circuited the motor will have a strong locking effect because the shading due to coils 18 is not sufficient to start the motor but with coils 19 short-circuited the motor will be shaded sufficiently to overcome the synchronous characteristic thus starting the motor and would, of course, run the motor above 1200 R. P. M. and less than 1800 R. P. M. However, once the motor has been started the shading coils 19 can be opened and the motor will immediately drop into its sub-synchronous locking speed.

While in the description of the illustrated embodiment of my invention I have referred to the primary member as the stator and the secondary member as the rotor, it will be understood that my invention is not limited to this arrangement but is intended to include arrangements wherein the primary member rotates and the secondary member is stationary.

I have shown switches 21 in a conventional manner and pointed out that they may be controlled manually, by centrifugal means, electromagnetic means, etc. In some applications it may be desirable to have the switches 21 controlled by speed responsive means on the motor, centrifugal or otherwise so that the coils 19 are open-circuited at the sub-synchronous locking speed, thus providing a motor with a high starting torque like an induction motor and a synchronous running torque like a synchronous motor. An example of a centrifugal device that might be used is illustrated in Patent No. 1,611,102 to DeBell, December 14, 1926.

The embodiment of my invention described and illustrated herein has been selected for the purpose of clearly setting forth the principles involved. It will be apparent, however, that the invention is susceptible of being modified to meet different conditions encountered and is particularly susceptible to being modified as to the relative number of primary and secondary poles. In any case, so long as the number of pairs of secondary poles is larger than the number of pairs of primary poles it will be found that the motor will have a sub-synchronous locking speed. This speed will be found to be dependent upon the number of effective salient poles on the secondary and will be the same as the speed of a synchronous motor having a number of poles equal to this number of secondary poles; for example, in the embodiment illustrated the sub-synchronous speed, when operated on sixty cycle current, is 1200 R. P. M. which is the synchronous speed of a six pole synchronous motor. This is due to the fact that the rotor has the equivalent of six salient poles. Similarly, if my invention is applied to a motor having a six pole stator and an eight pole rotor the sub-synchronous locking speed, when operated on sixty cycle current, will be 900 R. P. M., whereas the higher speed as an induction motor with the auxiliary shading coils short-circuited would be 1200 minus the slip.

While I do not limit myself to an arrangement wherein the number of secondary poles is prime to the number of primary poles, such an arrangement is usually preferable since it gives a less prominent sub-synchronous locking characteristic and, therefore, facilitates the design of my improved motor for certain desired operating speeds.

It will be understood that I do not limit myself to the use of shading coils as a means of producing a component of quadrature flux in time and space phase to the main flux since any other well known means may be used providing it is arranged so that its effect may be substantially diminished after the motor has been started so as to allow the motor to operate at its sub-synchronous locking speed.

What I claim as new and desire to secure by Letters Patent of the United States is:

1. An alternating current motor comprising relatively rotatable primary and secondary members, said primary member including means for producing main and quadrature components of flux, said secondary member including means for producing an induction motor torque, and means for producing a sub-synchronous locking torque and means for selectively varying the relative intensity of said main and quadrature components of flux.

2. An alternating current motor comprising relatively rotatable primary and secondary members, said primary member including means for producing main and quadrature components of flux, said secondary member including means for producing an induction motor torque and means for producing a sub-synchronous locking torque, and means independent of variations in applied voltages for selectively varying the relative intensity of said main and quadrature components of flux.

3. An alternating current motor having relatively rotatable primary and secondary members, said secondary member including a closed winding and means for producing relatively well defined magnetic poles, said primary member including means for producing main and quadrature components of flux acting upon said secondary member and means for selectively varying the relative intensity of said components of flux.

4. An alternating current motor having relatively rotatable primary and secondary members, said primary member including means for producing main and quadrature components of flux acting upon said secondary member, said secondary member including means for producing an induction motor torque, and means for producing a sub-synchronous locking torque, means for increasing the relative intensity of the quadrature component of said flux to such a value that the motor speed is proportional to the number of magnetic poles on said primary member, and means for alternatively decreasing the relative intensity of the last mentioned component of said flux to such a value that the motor speed is equal to the sub-synchronous locking speed.

5. An alternating current motor comprising relatively rotatable primary and secondary members, said secondary member having a closed winding, and means for producing relatively well defined magnetic poles, said primary member including means for producing main and quadrature components of flux acting upon said secondary member, means for producing a second component of quadrature flux and means for selectively varying the intensity of said second component of flux.

6. In an alternating current motor having relatively rotatable primary and secondary members, the primary member having a main winding and a plurality of sets of auxiliary flux shading windings, said secondary member including means for producing an induction motor torque and means for producing a sub-synchronous locking torque, said induction motor torque having such a value that the motor speed is normally proportional to the number of magnetic poles on the primary member, and means for open-circuiting one of said sets of auxiliary windings to decrease the motor speed to the sub-synchronous locking speed.

7. In an alternating current motor, a stator provided with inwardly projecting split poles, main energizing windings surrounding only alternate poles, permanently short-circuited auxiliary flux shading coils surrounding a portion of each of said last mentioned poles and selectively short-circuitable auxiliary flux shading coils surrounding a portion of each of the remaining poles and a rotor carrying thereon a squirrel cage winding giving a salient pole effect.

8. An alternating-current motor comprising a single-phase shaded-pole stator provided with a given number of salient magnetic pole pieces, and an induction motor secondary rotor provided with a greater number of magnetic pole pieces, the motor as thus constituted having an induction motor torque corresponding to the number of stator pole pieces and a synchronous motor torque corresponding to the number of rotor pole pieces, and means for changing the value of the induction motor torque at a desired speed when the motor is in operation to change from induction motor to synchronous motor operation.

JULIAN H. STARK.